April 27, 1965    G. E. FRANCE ETAL    3,180,319
HOG TROUGH
Filed Oct. 25, 1962
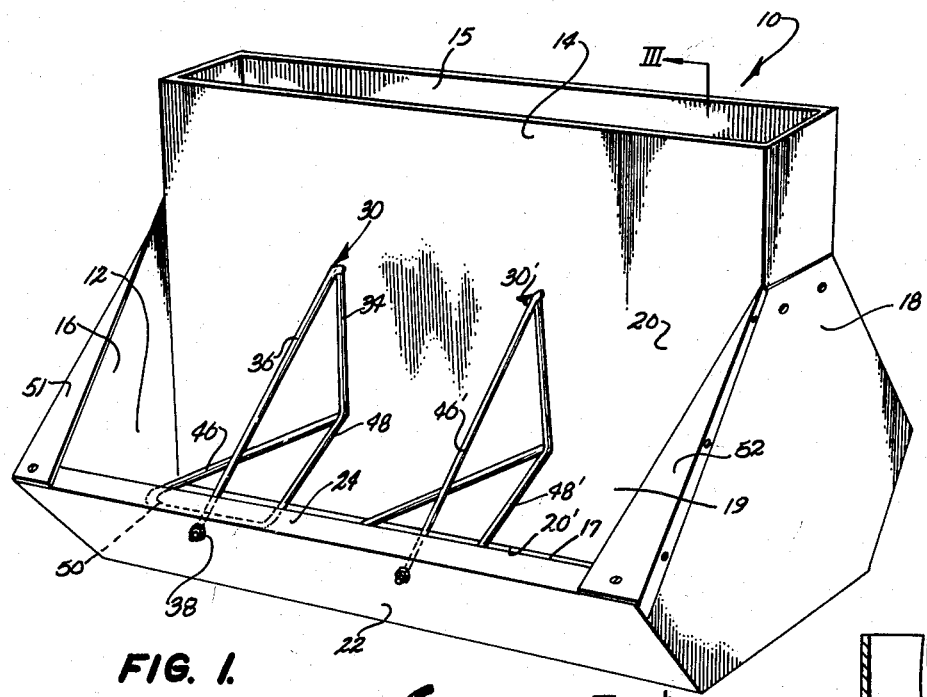
FIG. 1.
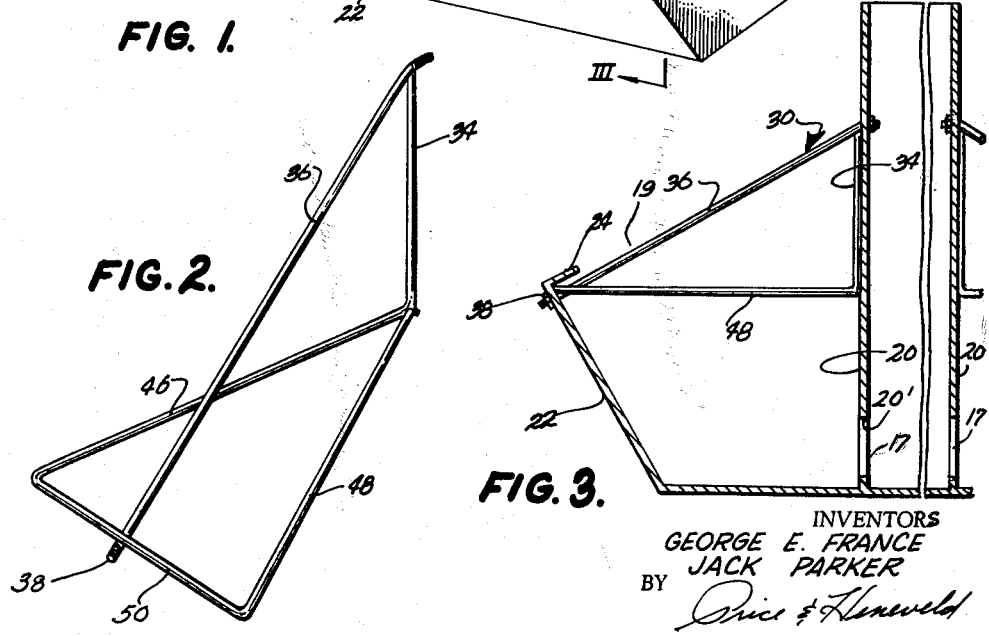
FIG. 2.
FIG. 3.
INVENTORS
GEORGE E. FRANCE
JACK PARKER
BY
ATTORNEYS United States Patent Office 3,180,319
Patented Apr. 27, 1965

3,180,319
HOG TROUGH
George E. France and Jack Parker, Holland, Mich., assignors to Automatic Poultry Feeder Company, Zeeland, Mich., a corporation of Michigan
Filed Oct. 25, 1962, Ser. No. 233,071
7 Claims. (Cl. 119—61)

This invention relates to hog feeding apparatus, and more particularly to a novel hog trough, and a novel hog trough insert.

The conventional hog trough provides access to the pig through a rectangular or similarly configurated opening. When hogs are being fed dry or semi-dry feed such as meal from such a trough, a substantial amount of spillage of food onto the ground or the floor regularly occurs, as is commonly known. It has been found that this spillage is caused by the natural tendency of the hogs to whisk their snouts sideways in the food, in a manner similar to their routing when grubbing for food. When feeding in a trough, this constant side thrust of the hog's snout pushes and throws food out of the trough. This not only results in a considerable percentage of wasted food, but also encourages the hogs to eat from the dirty floor or ground. This latter factor greatly increases the probability of their being infected with disease, and destroys the efforts of hog raisers to insure cleanliness in their eating habits. Even when a hog trough is divided into sections for the individual hogs, if each section is made wide enough to provide sufficient eating space for the hogs, it is wide enough to allow this type of spillage.

Another disadvantage associated with conventional hog troughs is the necessity of periodic cleaning of caked, dried food from the trough corners, including the many corners created by the separating panels of sheet metal which divide the trough into sections. It has been found that the saliva of the hogs acts as a binding agent for the granular food particles. The hogs are not capable of gleaning food from the trough corners to prevent this.

It is therefore an obect of this invention to provide a hog trough that substantially eliminates spillage by hogs from troughs. The novel trough prevents the hog from practicing his natural habit to route sideways with his snout and spill the food from the trough. Yet it provides completely adequate space for eating all of the food out. The inventive structure almost completely eliminates costly waste of valuable food. The novel trough insures cleanliness in hog eating habits by not encouraging them to eat from the dirty floor or ground.

It is another object of this invention to provide a partitioned hog trough that separates the access area into different sections for a plurality of hogs, and yet that requires practically no periodic cleaning of caked food from the trough. Moreover, this same trough not only provides separate eating sections, and eliminates the necessity for the removal of caked food, but it also prevents spillage by the hogs.

It is still another object of this invention to provide a special partitioning insert for a hog trough that prevents the spillage by the hogs and simultaneously serves to separate the trough into independent feeding sections.

Still another object of this invention is to provide an insert for a hog trough that serves to divide the trough into eating sections, that eliminates the food caking problem by allowing the hogs every bit of the food, and that prevents the spillage by side thrust of the hog's snout.

These and other objects of this invention will be apparent upon studying the following specification in conjunction with the drawings in which:

FIG. 1 is a perspective view of the inventive hog trough with insert;

FIG. 2 is a perspective enlarged view of the configurated rod insert; and

FIG. 3 is a fragmentary, sectional, enlarged, side elevational view of the novel hog trough with insert.

Basically, the inventive hog trough comprises trough means having an access opening with a relatively narrow front dimension and a relatively wide back dimension, i.e. the opening is generally trapezoidal in configuration. The narrowness of the opening front prevents sideward movement of the hog's snout to prevent spillage, while the wideness of the opening back allows liberal access to all of the food. This configuration is preferably achieved by diagonal elements adjacent the end panels of the trough, in combination with configurated rod type inserts dividing the access opening into independent sections. These inserts have diverging legs from the back to the front of the opening, cooperating with similar legs on the opposite sides of the respective feeding sections. Each insert preferably comprises a continuous configurated rod formed generally into a vertical triangle, with the lower leg of the vertical triangle comprising a second horizontal, isosceles triangle.

Referring more specifically to the drawings, the novel hog trough 10 includes a trough means 12 adapted to hold feed therein. It may also include a central refill hopper 14 having an opening 15 in the top for supplying food to lower openings 17 on both sides of the device beneath the lower edge 20' of panel 20. The trough means 12 includes opposite access openings 19 between the end partitions 16 and 18. The double type trough shown may be a single opening type within the concept of this invention. In this case, the second hopper outlet opening 17 is of course not provided.

The back of trough 20 is formed by the wall of hopper means 14. The front of the trough is formed by a sheet metal panel 22. This panel preferably has a flange 24 projecting toward the back 20 to prevent hogs from dragging food straight out with their snout.

Mounted within the trough is at least one, and preferably a plurality of configurated rod elements or devices 30 and 30'. These are formed of a rigid rod approximately ¼" in diameter. These divide the access opening and trough means into a plurality of feeding sections. They also prevent spillage of food by feeding hogs. Each of the configurated elements 30 has a peculiar horizontal dimension to prevent spillage and a vertical dimension to clearly separate the feeding sections. The vertical section may be in the form of a triangle with one leg 34 being adjacent to and in contact with back wall 20, with the top leg 36 projecting diagonally outwardly and downwardly to the front of the trough. The lower end 38 of leg 36 is bolted to front panel 22, while the upper end 39 is bolted through the wall of the hopper (FIG. 3). The bottom leg of the vertical triangle is in the form of a horizontal generally isosceles triangle. The triangular configuration of the vertical portion is preferable, but not absolutely essential. The triangular or nearly triangular configuration of the generally horizontal portion is necessary in order to provide the diverging edges or legs to prevent spillage as explained hereinafter. The plane of the lower triangle, i.e. the plane containing diverging legs 46 and 48 and base 50 is generally perpendicular to the plane of the vertical triangle containing legs 34 and 36.

The cross leg 50 of the lower triangle is positioned between flange 24 of front panel 22, and the terminating connected end 38 of leg 36. This holds the cross leg 50 snugly and securely in position, so that when back leg 34 is placed in contact with wall 20 and the nut is connected at 38, the entire configurated rod element is secured rigidly in position.

The trough end panels 16 and 18 have adjacent thereto a pair of flange elements 51 and 52 which project diagonally across a portion of the ends of the trough opening so that the inner edges project somewhat toward each other from the back to the front of the trough. These may form an integral part of the end panels, or may be bolted to the ends of the trough. They may be of sheet stock as shown, or may be formed of rod material.

It will be noted that the three feeding sections or openings formed between the two end elements and the two insert elements have a narrower front dimension and a wider back dimension due to the diverging legs of the inserts and the diagonal end elements 51 and 52. Diagonal element 51 cooperates with leg 46 of insert 30 to create a generally trapezoidal access opening for the hog. Likewise, leg 48 cooperates with leg 46', and leg 48' cooperates with element 52 to similarly form definitely configured access openings to the sections. Any number of such feeding sections can be provided. It may be desirable sometimes to provide end elements 51 and 52 in the same general plane as the diverging legs of the divider insert devices 30.

In use, feed is placed in hopper 14 of hog trough 10 and a plurality of hogs eat in independent sections of the trough. It has been found that the relatively narrow width at the front prevents hogs from routing feed out onto the ground by side thrust of their snout. Although completely adequate feeding space is provided because of the wide back of each section opening, sideward movement of the hog's snout is completely restricted because the hog must necessarily move his snout in an arc if he is to rout food sideways out onto the ground. With this trapezoidal opening, this arcuate routing action is prevented by the generally horizontal, diverging legs (48 and 46" for example) on the opposite sides of each feeding section. It is conceivable that, in the broader aspects of this invention, only the horizontal diverging legs or edges would be adequate, not only to prevent spillage, but also to separate the sections. However, it is preferred to have a vertical dimension to the inserts to clearly divide the trough.

Even though the novel partitions have a vertical dimension, no caking of the food occurs since the hogs can completely eat all of the food around the partition elements. This is due both to their open nature, and also to their spacing from the bottom of the trough. Thus, no saliva-caked food remains to dry and cake into the corners between the dividing partitions to require cleaning.

It is conceivable that within broader aspects of ths invention, solid partition elements having horizontally diverging edges resembling legs 46 and 48 may be utilized to prevent spillage. However, it has been found that the configurated rod elements with their open construction are preferable by far, since they not only prevent spillage but prevent caking and trough cleaning, as well as preventing spillage, and dividing the trough into sections.

It is realized that those in the art, after studying the principles of the invention as taught, will be able to devise various configurations to suit a particular trough or method of manufacture. For example, the generally horizontal triangle 46, 48, 50 may be slightly trapezoidal and the vertical triangle 34, 36, etc. may be rectangular, trapezoidal, or the like. The diagonal feature is essential to prevent the arcuate movement of the hogs head and nose, and thereby to prevent spillage. These obvious deviations from the structural details shown as an example, and as the preferred form of the invention, are deemed to be part of this invention, which is to be limited only by the scope of the appended claims, and the reasonably equivalent structures to those defined therein.

We claim:

1. An animal feeding trough, comprising: trough means including end panels and front and back panels, said panels defining a generally horizontal access opening; a plurality of dividers dividing said opening into sections; each of said dividers including a horizontal portion and a vertical portion above said horizontal portion, said portions both extending between said back and front panels; said horizontal portion including a pair of rods located on substantially a horizontal plane and converging toward each other from the front panel to said back panel to form an angle therebetween; said vertical portion including a rod inclined downwardly from the back panel to said front panel and located on a plane normal to and substantially bisecting the angle formed between said pair of rods; the pair of rods of said horizontal portion cooperating with adjacent dividers or said end panels to prevent substantial sidewards movement of hog snouts, and thereby prevent spillage; said inclined rod providing means for separating hogs eating in adjacent sections.

2. The trough in claim 1 wherein each divider comprises in plan view a generally horizontal triangle integral with a portion which in side elevational view is a vertical triangle having said horizontal triangle at its base.

3. The hog trough in claim 1 wherein each of said dividers comprises a rod structure in side elevational view formed in the shape of a vertical triangle, with the lower leg of said triangle in plan view comprising a horizontal triangle.

4. The animal feeding trough of claim 1 in which the inclined rod of said vertical portion has means at its ends for securement to said back and front panels, respectively.

5. The animal feeding trough of claim 1 in which the vertical portion also includes a rod extending along said back panel upwardly from the horizontal portion to one end of the inclined rod.

6. The animal feeding trough of claim 1 in which the horizontal portion comprises a triangle formed by said pair of rods connected together at one of their ends at said back panel and a third rod extending between and connected to the other of said ends at said front panel.

7. The animal feeding trough of claim 6 in which the vertical portion includes a rod secured to said pair of rods where they are connected together and extending upwardly along said back panel to said inclined rod.

References Cited by the Examiner

UNITED STATES PATENTS

| 892,071 | 6/08 | McArthur | 119—61 |
| 1,046,943 | 12/12 | Barth | 119—63 |
| 1,066,710 | 7/13 | Clarke | 119—52 |
| 1,167,557 | 1/16 | Hesser | 119—63 |
| 2,533,538 | 12/50 | Uhrenholdt | 119—54 |

FOREIGN PATENTS 123,485  2/19  Great Britain.

SAMUEL KOREN, *Primary Examiner.*

CARL W. ROBINSON, HUGH R. CHAMBLEE,
*Examiners.*